United States Patent
Agre et al.

(10) Patent No.: US 6,208,857 B1
(45) Date of Patent: *Mar. 27, 2001

(54) METHOD AND APPARATUS FOR PERFORMING POSITION-AND PREFERENCE-BASED SERVICE SELECTION IN A MOBILE TELEPHONE SYSTEM

(75) Inventors: Daniel H. Agre, San Diego; Michael K. Spartz, San Marcos; Roy F. Quick, San Diego, all of CA (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/743,511

(22) Filed: Nov. 4, 1996

(51) Int. Cl.[7] ............................. H04Q 7/36; H04Q 7/22
(52) U.S. Cl. ...................... 455/428; 455/429; 455/440
(58) Field of Search .................................. 455/427, 428, 455/429, 433, 436, 440, 441, 12.1, 13.1

(56) References Cited

U.S. PATENT DOCUMENTS

| | | | |
|---|---|---|---|
| 4,112,257 | 9/1978 | Frost | 455/437 |
| 4,756,007 | 7/1988 | Qureshi et al. | 375/259 |
| 4,763,322 | 8/1988 | Eizenhofer | 370/337 |
| 4,795,210 | 1/1989 | Milat | 297/188.2 |
| 4,905,301 | 2/1990 | Krolopp et al. | 455/434 |
| 5,123,111 | 6/1992 | Delory et al. | 455/432 |
| 5,239,294 | 8/1993 | Flanders et al. | 340/825.34 |
| 5,267,244 | 11/1993 | Messerschmitt et al. | 370/342 |
| 5,410,728 | * 4/1995 | Bertiger et al. | 455/428 |
| 5,523,997 | * 6/1996 | Bishop, Jr. | 455/428 |
| 5,555,444 | * 9/1996 | Diekelman et al. | 455/13.1 |
| 5,561,836 | * 10/1996 | Sowles et al. | 455/428 |
| 5,604,920 | * 2/1997 | Bertiger et al. | 455/13.1 |
| 5,752,162 | * 5/1998 | Sawyer et al. | 455/428 |

* cited by examiner

Primary Examiner—Willis R. Wolfe
(74) Attorney, Agent, or Firm—Phillip R. Wadsworth; Gregory D. Ogrod; Thomas M. Thibault

(57) ABSTRACT

The mobile telephone system employs a fleet of satellites and a set of gateway ground stations arranged around the globe for handling communications to and from mobile communication units such as mobile telephones. Signals are transmitted between a subscriber unit and the nearest gateway via one or more of the satellites. The gateway is connected to a set of individual service providers such as local telephone systems. The individual service providers may be constrained for various reasons such as contractual or other legal constraints to handle communications only from subscriber units located in certain geographical areas such as within only certain countries or portions of countries. For a mobile communication from a particular subscriber unit, the gateway selects a service provider capable of handling the communication. In one implementation, the selection is based upon the location of the subscriber unit and upon any preferences specified by the subscriber unit. In other implementations, the selection is based on other parameters such as the altitude, speed or velocity of the subscriber unit or the time of day or date upon which the communication is initiated.

57 Claims, 6 Drawing Sheets

METHOD AND APPARATUS FOR PERFORMING POSITION-AND PREFERENCE-BASED SERVICE SELECTION IN A MOBILE TELEPHONE SYSTEM

BACKGROUND OF THE INVENTION

I. Field of the Invention

The invention generally relates to mobile telephone systems and in particular to service provider selection in a mobile telephone system.

II. Description of the Related Art

Satellite-based mobile telecommunications systems are being developed that allow a mobile communications subscriber unit such as a mobile telephone to be used almost anywhere in the world. In one system, illustrated in FIG. 1, a fleet of low earth orbit satellites are used along with a set of ground base stations 10 called "gateways". Signals are transmitted from a subscriber unit 12 to satellites 14 (shown as a single satellite for ease of drawing), then relayed down to gateway 10 for routing to one of a set of local service providers, generally denoted 16, which provide an interconnection to local land line telephone networks or other communication networks operated by a service provider. Depending upon the nature of the communication, the signals are ultimately routed to, for example, a telephone connected to the land line network, or to a mobile telephone perhaps operating in another part of the world covered by a different gateway, or perhaps to computer system. The signals may encode voice communications such as telephone conversations or data communications such as, for example, facsimile transmissions, Internet connection signals, etc. The subscriber unit 12 may be a hand-held mobile telephone, a mobile telephone mounted in a boat, train or airplane, a laptop computer, a personal data assistant or any other suitable communications unit provided with the proper equipment for communicating with the gateway via the satellite fleet.

A single gateway may handle all telecommunications traffic within an area covering as much as 2000 by 3000 kilometers. FIG. 2 illustrates an exemplary coverage area 18 for a gateway 20 operating in Europe. As can be seen, the coverage area encompasses many countries. Each country typically has one or more service providers. Depending upon the implementation, each service provider may operate only within one country or perhaps only within a portion of one country. Such restrictions may result from physical limitations on the capability of the service provider system or from contractual or other legal constraints. For example, even though operationally capable of doing so, a service provider in France may not be contractually and/or legally allowed to handle mobile communications for a subscriber unit operating in Italy and vice versa. Hence, for subscriber units in France (such as exemplary unit 22), the gateway may need to route communications through a French service provider such as TE.SA.M.; whereas, for subscriber units in Italy, the gateway may need to route communications through an Italian service provider such as Finmeccanica. Further, as represented by arrow 24, subscriber units may move from one country to another. Even within a single country the gateway may need to selectively route communications to different service providers depending upon the location of the subscriber unit within the country. Moreover, the operator of the subscriber unit may be contractually obligated to use certain service providers in certain locations or may be subject to other legal constraints. In addition to any contractual limitations that may prevent telephone connections from the subscriber unit from being connected to particular service providers, the user of the subscriber unit may simply have certain preferences regarding which services provider to employ.

For these and other reasons, it may be desirable for the gateway to be able to reliably coordinate access among numerous service providers and among numerous mobile telephone users over a large geographical area. Heretofore, no adequate system has been developed for that purpose, particularly one which takes into account user preferences. Aspects of the present invention are directed toward providing such a system.

SUMMARY OF THE INVENTION

In accordance with one aspect of the invention, a system is provided for selecting a service provider based upon the location of a subscriber unit or perhaps upon service provider preferences provided by the subscriber unit, or both. The service provider may be alternatively selected based upon the altitude, velocity or speed of the subscriber unit or upon the time of day or date or upon a combination thereof. The system, which may be part of a gateway ground base station, is employed in connection with a mobile communication system or other wireless communication system, such as a satellite-based communication system, having two or more service providers. The system selects one of the service providers for use in receiving signals from, and for routing signals to, a subscriber unit such as a mobile telephone. To this end, the system may interconnect a local Public Switched Telephone Network (PSTN) to the subscriber unit via the selected service provider. Selection of the service provider is performed, for example, as part of set up operations for a telephone connection initiated by the subscriber unit or terminated at the subscriber unit, or as part of a system registration access procedure initiated by the subscriber unit.

In an implementation wherein selection is based upon location, different service providers may handle communications for subscriber units in different geographical areas. Accordingly, the means for selecting one of the service providers may operate to identify the geographical area in which the subscriber unit is disposed and selects a service provider available for handling communications from subscriber units in that geographical area. The geographical areas of the service providers may overlap. Hence, two or more service providers may be available in any particular area. The different geographical areas may be different countries or different parts of the same country. The availability of a service provider to handle mobile communications from the geographical area of the subscriber unit may be constrained, in part, by operational factors or by contractual or other legal factors.

The location of the subscriber unit may be determined in accordance with any one of a variety of techniques. For satellite-based systems, the location may be determined based upon time differences and frequency shifts of signals received by the satellites from the subscriber unit. Alternatively, the subscriber unit may be provided with some means for determining its own location, such as a Global Positioning System (GPS) unit. In one implementation, the location of the subscriber unit is approximated with a degree of confidence and the service provider is selected based, in part, upon the degree of confidence.

The location of the subscriber unit, once determined, is applied to a table, or other means, listing all of the service providers available for handling mobile communications from that location area. The table takes into account the aforementioned constraints, such as contractual or other legal constraints. Based upon the location of the subscriber unit, the table may identify that one service provider is available, no service providers are available or more than one service provider is available for handling communications from the subscriber unit.

If more than one service provider is available, the system operates to select one of the service providers based upon a preference provided by the subscriber unit. The preference may be provided as part of a subscriber unit system access message (used in a subscriber unit origination, response to an incoming call, a system registration access, etc.), or it may be in response to a query by the system. The preference specified by the subscriber unit may be the identification of the last service provider to which the subscriber unit was registered. In the case where the system queries the subscriber unit for the preference, the system sets a timer upon issuing the request, and if the timer elapses before receiving a response, the system terminates further action with respect to that particular communication, e.g. the system terminates the connection set up.

If only one service provider is available, the system merely selects that service provider. If none are available, the system notifies the subscriber unit that no service providers are available and that mobile communication therefore cannot proceed.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 4:
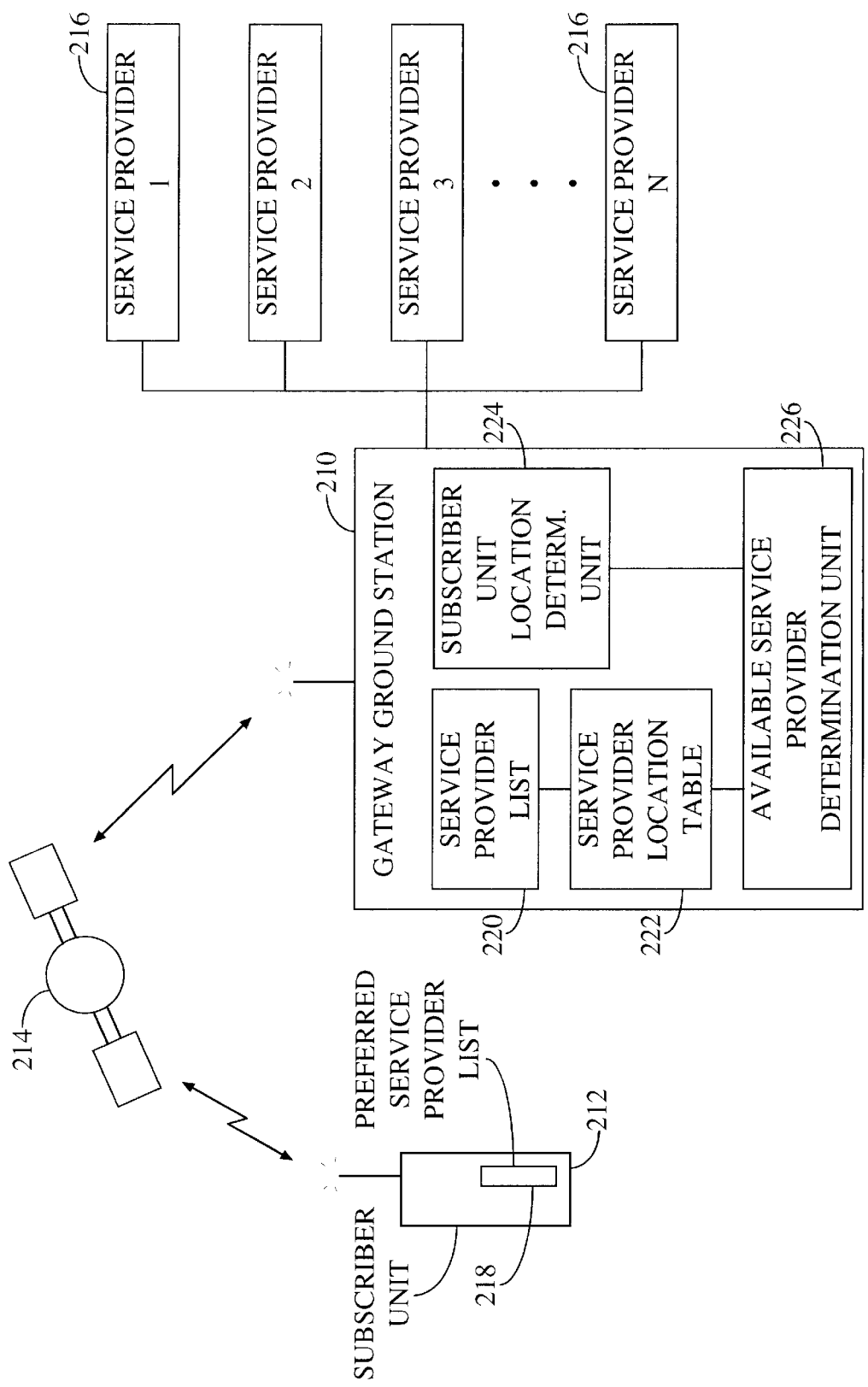
FIG. 4 is a diagram representing the satellite-based mobile telephone system performing the method of FIGS. 3A and B and having means within the gateway ground station of the system for determining the location of a subscriber unit.
Figure 5:
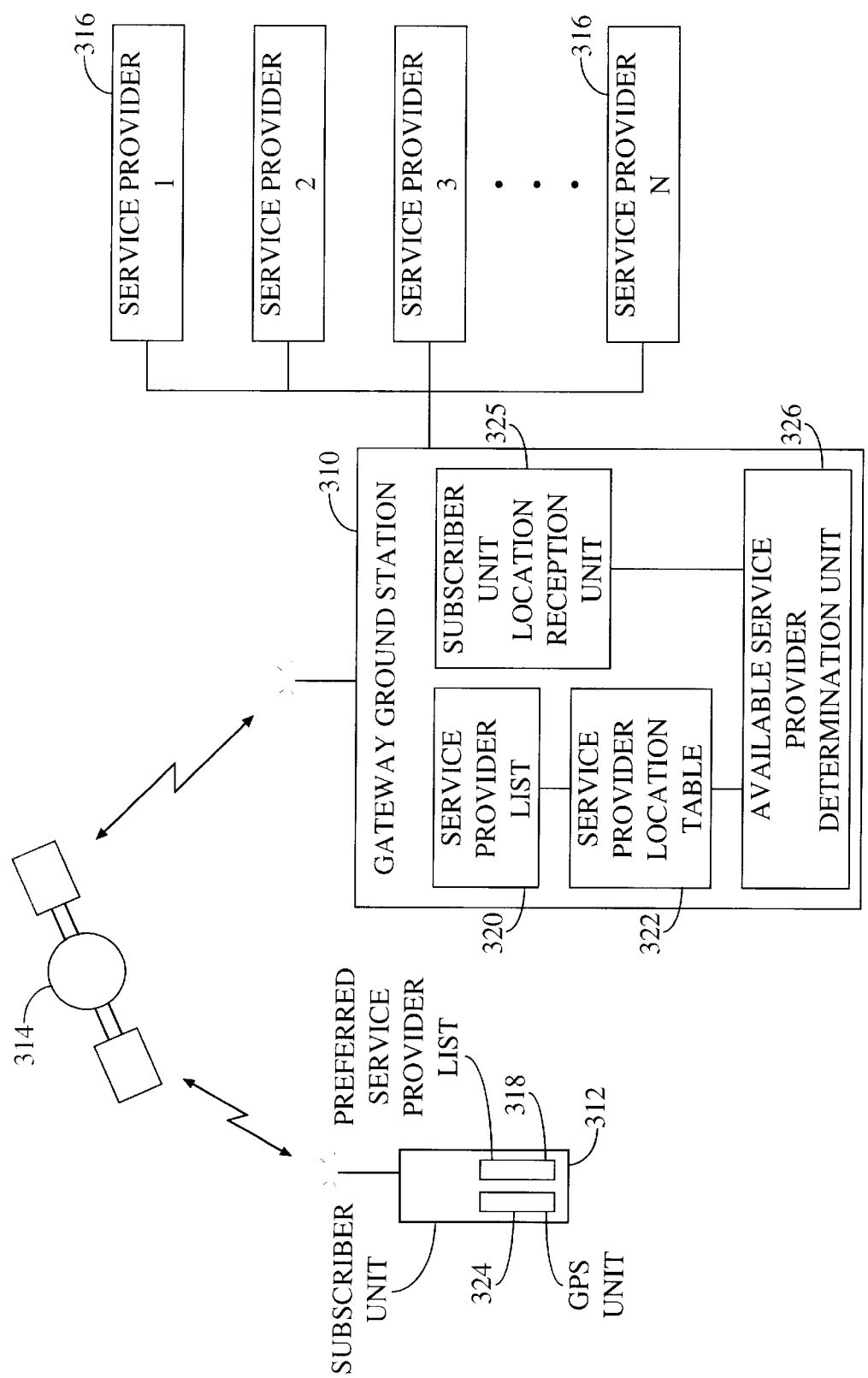
FIG. 5 is a diagram representing an alternative satellite-based mobile telephone system similar to that of FIG. 4 but wherein the subscriber unit includes the means for determining location.

With reference to the remaining figures, preferred and exemplary embodiments of the invention will now be described. The embodiments will initially be described at a high level with reference to a satellite-based mobile communication system illustrated in FIGS. 3–5 utilizing subscriber unit location information and user preferences to select a service provider. FIG. 4 shows an implementation wherein a gateway ground station attempts to determine the location of the subscriber unit based. FIG. 5 shows an implementation wherein the subscriber unit determines its own location via GPS techniques. The preferred embodiment of the invention conducts connection processing in accordance with the IS-41 standard, the use of which is well known in the art.

Figure 3A:
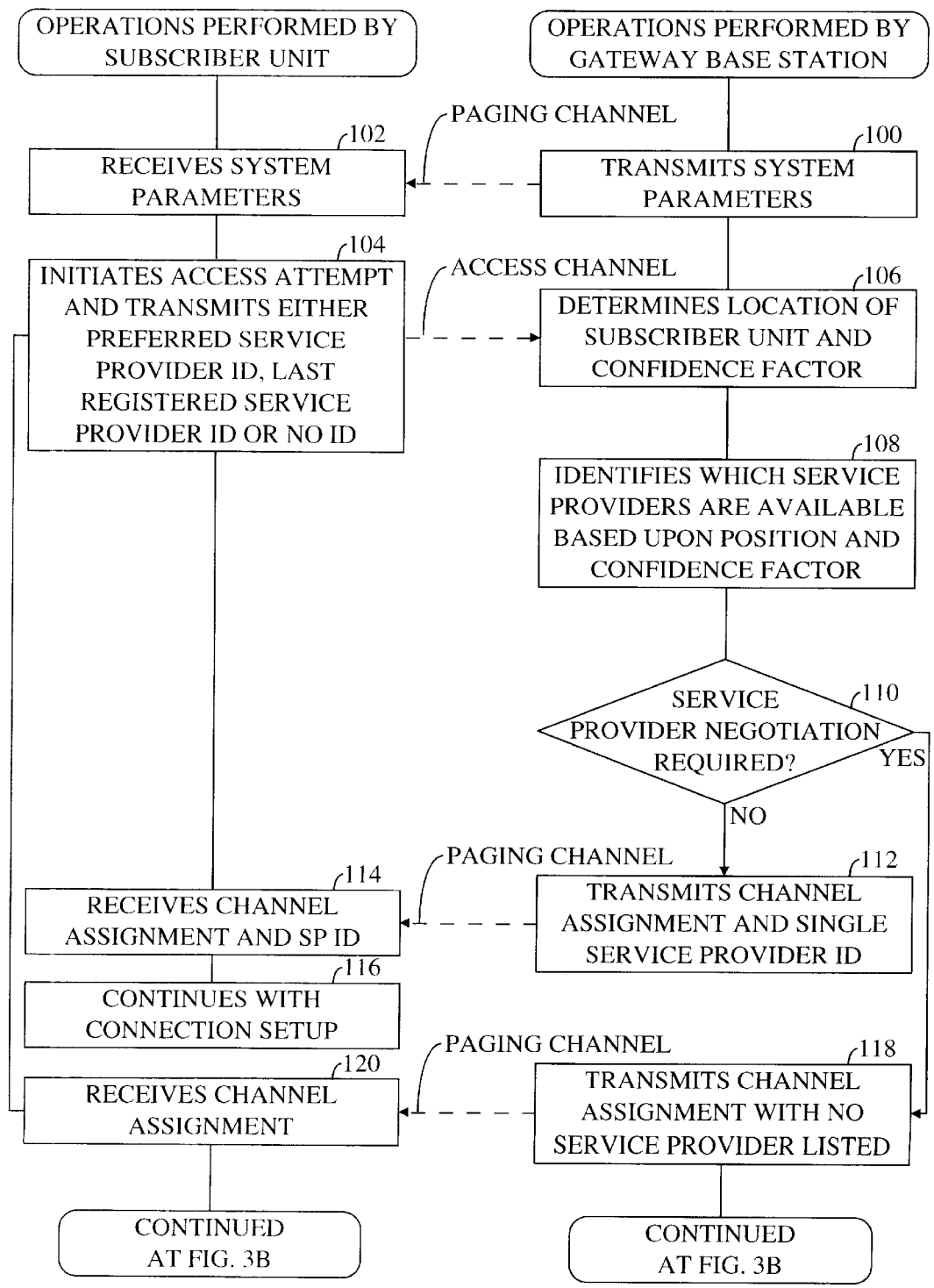
FIGS. 3A and 3B together provide a flow-chart illustrating a method, implemented in accordance with an exemplary implementation of the invention, for selecting a service provider for a satellite-based mobile telephone system employing a gateway ground station.
Figure 3B:
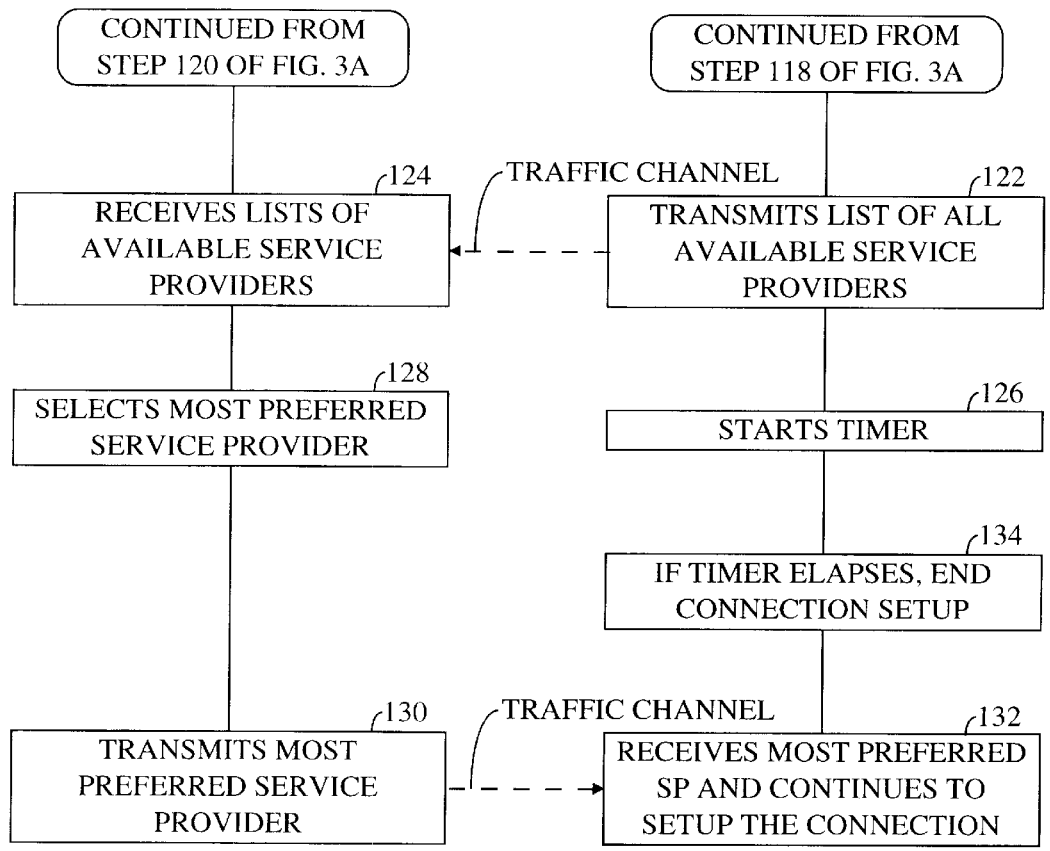

The flow chart of FIGS. 3A and 3B illustrates operations performed during initiation of a connection from a subscriber unit. The figure illustrates, in tandem, both operations performed by the subscriber unit and those performed by the gateway ground station. Transmissions between the subscriber unit and ground station are represented by dashed arrows. All such transmissions are achieved by transmitting signals up to one or more satellites which relay the signals back to earth.

Initially, at step 100, the ground station transmits system parameters over a paging channel which identify the gateway (by gateway_id), the service providers connected by the gateway (by service_id) and any other appropriate system parameters such as satellite beam_id. The system parameters are transmitted repeatedly and periodically such that any subscriber unit in the coverage area of the ground station may receive the information. The list of service providers transmitted specifies every service provider connected to the gateway including service providers which may not be available for use by the subscriber unit at its current position because of, for example, operational or contractual limitations.

At step 102, the subscriber unit receives the system parameters over the paging channel. This step is typically performed when the subscriber unit is powered-up. The user then attempts to initiate a telephone call or other telephonic connection at step 104 at which time the subscriber unit transmits access information over an access channel including access registration requests, origination information, and channel requests. The subscriber unit also transmits a selected service_provider_ID, if available, and a registration bit. In this regard, the subscriber unit first accesses a preferred service provider table or other data base (not shown) within the subscriber unit which identifies the preferred service provider. Depending upon the implementation, the subscriber unit may store only a single preferred service provider, a different preferred service provider for each gateway coverage area, or perhaps different preferred service providers for different times of the day or for different dates etc. If there is no preferred service provider listed, the mobile telephone transmits the ID of the service provider the mobile telephone was last registered with, perhaps as a result of a previous telephone connection, or simply does not transmit any service provider ID. If the subscriber unit transmits the ID of last registered service provider, the subscriber unit also transmits a registration bit of 1; otherwise the registration bit is transmitted as 0. If no preferred or last-registered service providers are available, the mobile telephone does not transmit any service provider information. In other implementations, the subscriber unit may transmit multiple service provider ID's ordered according to preference or may transmit service_provider_ID's that the subscriber unit, for some reason, cannot or will not allow itself to be connected to.

At step 106, the gateway receives the access channel messages and attempts to determine the location of the subscriber unit to thereby determine what service providers are available for handling connections from the subscriber unit. In one embodiment, the subscriber units transmit to the gateway information representative of the relative time delays and frequency shifts of signals received at the subscriber unit from one or more satellites. Using that information, and the information identifying the location of the satellites, the gateway approximates the location of the subscriber unit. Various methods for performing position location in a satellite based wireless communication systems are described in U.S. patents applications entitled "Unambiguous Position Determination Using Two Low-Earth Orbit Satellites" having application Ser. No. 08/723,725, "Position Determination Using One Low-Earth Orbit Satellite" having application Ser. No. 08/723,751, now U.S. Pat. No. 6,107,959, "Passive Position Determination Using Two Low-Earth Orbit Satellites" having application Ser. No. 08/723,722, now U.S. Pat. No. 6,078,284, "Ambiguity Resolution For Ambiguous Position Solutions Using Satellite Beams" having application Ser. No. 08/723,723, now U.S. Pat. No. 5,920,284, "Determination Of Frequency Offsets In Communication Systems" having application Ser. No. 08/723,724, now U.S. Pat. No. 5,943,606, and "Time And Frequency Precorrection For Non-Geostationary Satellite Systems" having application Ser. No. 08/733,490, now U.S. Pat. No. 5,713,288, which are incorporated herein by reference. The gateway also assigns a confidence factor or level identifying how reliable or accurate the location determination is. The confidence level may be low when the location is determined using the above-described techniques employing relative time and frequency calculations. Nevertheless, the confidence level is typically at least sufficient to reliably identify the subscriber unit as being in a particular country or within a particular service provider region within a country. In the embodiment to be discussed below wherein GPS techniques are employed, the location determination may be very precise and the confidence factor thereby very high.

At step 108, the gateway determines which service providers are available for handling the telephone connection initiated by the subscriber unit based on the location of the subscriber unit. In this regard, the gateway accesses a service provider location table which represents the range of locations that each service provider handled by the gateway can cover. The range of locations may be represented, for example, as ranges of latitudes and longitudes. As noted, the range of locations may be affected by contractual or other legal constraints or by physical operating constraints. In any case, the gateway compares the location of the subscriber unit with the service provider coverage information of the database and identifies those service providers that are available.

The determination of the availability of a service provider may be affected by the confidence factor of the location determination. For example, if the location of the subscriber unit is found to be near a border or other dividing line between two service provider coverage areas but confidence level is low such that the system cannot be certain which coverage area the subscriber unit is in, it may be necessary, perhaps on contractual grounds, to declare that neither service provider is available and that the telephone connection therefore cannot be completed. In other implementations, any service provider that has a coverage area that the subscriber unit might be in is identified as being available. Thus, if the subscriber unit is determined to be in Germany but the confidence level is so low that the subscriber unit may actually be in France instead, the gateway designates all appropriate French or German service providers as being available. Other variations and implementations are possible as well.

In this manner the gateway identifies a list of available service providers, if any. If the subscriber unit transmits a preferred service provider ID, the gateway determines if the preferred service provider is among the available service providers and eliminates all others. If the subscriber unit transmits a list of service providers that are unacceptable, the gateway eliminates any from the list of available service providers for that subscriber unit. If the subscriber unit transmits a list of acceptable service providers ordered by preference, the gateway picks the most preferred. If the subscriber unit does not transmit a preferred service provider, but instead transmits the last registered service provider as identified by the set registration bit, and that provider is on the list, the gateway eliminates all other entries. Ultimately, this process yields a list of available service providers that either has no entries, one entry or multiple entries.

Next, the gateway determines at step 110 whether it needs to negotiate with the subscriber unit to allow selection of a single service provider. If either no service providers or only a single service provider remains on the list of available service providers, then no negotiation is needed. If none remain, a signal is sent to the subscriber unit indicating that connection setup cannot proceed. If more than one service provider remains on the list, then the gateway negotiates with the subscriber unit to allow the subscriber unit to select one the available service providers.

If it is determined that no negotiation is required, at step 110, then execution proceeds to step 112, where the gateway assigns a traffic channel for the mobile telephone and transmits a traffic channel assignment information on the paging channel to the subscriber unit. In the preferred embodiment, the traffic channel is a private non-shared signaling and user-traffic-bearing channel. The traffic channel assignment information includes an identification of the single service provider identified by the gateway. The subscriber unit receives the traffic channel assignment information identifying the service provider at step 114 and proceeds with connection set-up at step 116. In some implementations, the subscriber unit may store a list of unacceptable service providers and, if the service provider identified in the traffic channel assignment message is unacceptable, the subscriber unit aborts the telephone connection or notifies the gateway that the service provider is unacceptable.

If it is determined that negotiation is required, at step 110, then execution proceeds to step 118, where the gateway assigns a traffic channel for the mobile telephone and transmits a traffic channel assignment information on the paging channel to the subscriber unit without a service provider ID. The subscriber unit receives the transmitted information at step 120. Thereafter, the gateway transmits on the traffic channel, at step 122, the list of acceptable service providers. The mobile station receives the list of available service providers at step 124. Referring now to FIG. 3B, after the transmission, the gateway sets a timer, step 126. The subscriber unit selects the most preferred one of the service providers at step 128 by comparing against a pre-stored list, and transmits the corresponding service provider ID at step 130 which the gateway receives at step 132 on the assigned traffic channel. If the timer set at step 126 expires before the gateway receives the most preferred service provider at step 132, the gateway terminates connection setup at step 134 and step 132 is therefore not executed. It should be noted that in the preferred embodiment of the invention, steps 118–134 are only required if the subscriber unit does not initially transmit preferred service provider information at step 104 such as if a suitable service provider cannot be determined during steps 104–110.

Hence, the subscriber unit and gateway together perform steps for selecting an appropriate service provider based upon the location of the subscriber unit and any preferences specified by the subscriber unit. Once the selection is established, the subscriber unit and gateway proceed with processing the telephone connection. In one embodiment of the invention, the location of the subscriber unit is updated periodically during the connection, and, if the subscriber unit is found to have traversed into an area wherein the original service provider is no longer available, the gateway and subscriber unit re-negotiate for a new service provider and the appropriate steps of FIG. 3 are repeated. Preferably these steps are performed without disrupting the mobile communication in progress. In some situations, however, it may be necessary to terminate the connection if a new available service provider cannot be found.

Figure 1:
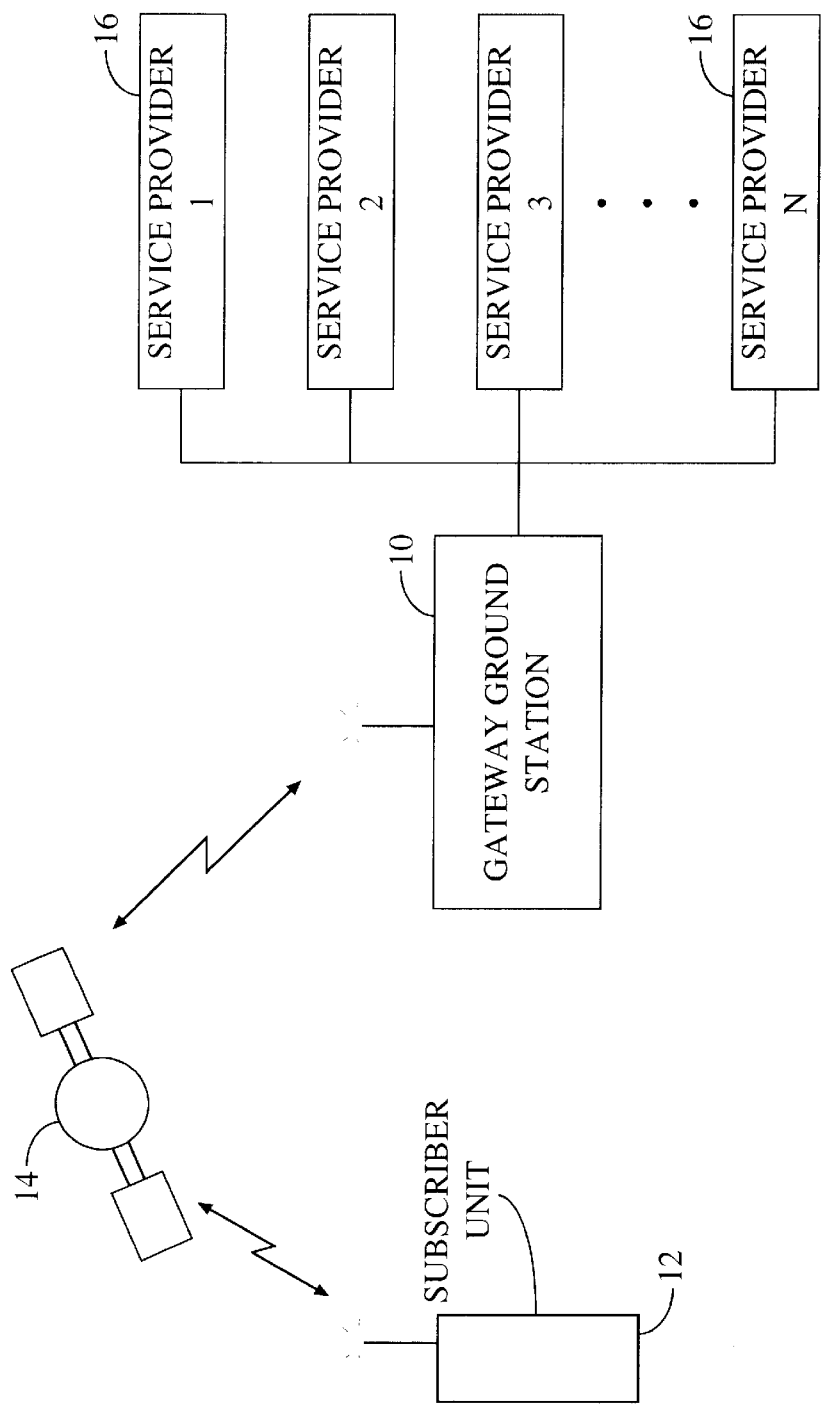
FIG. 1 is a diagram representing a satellite-based mobile telecommunications system employing a gateway ground station.
Figure 2:
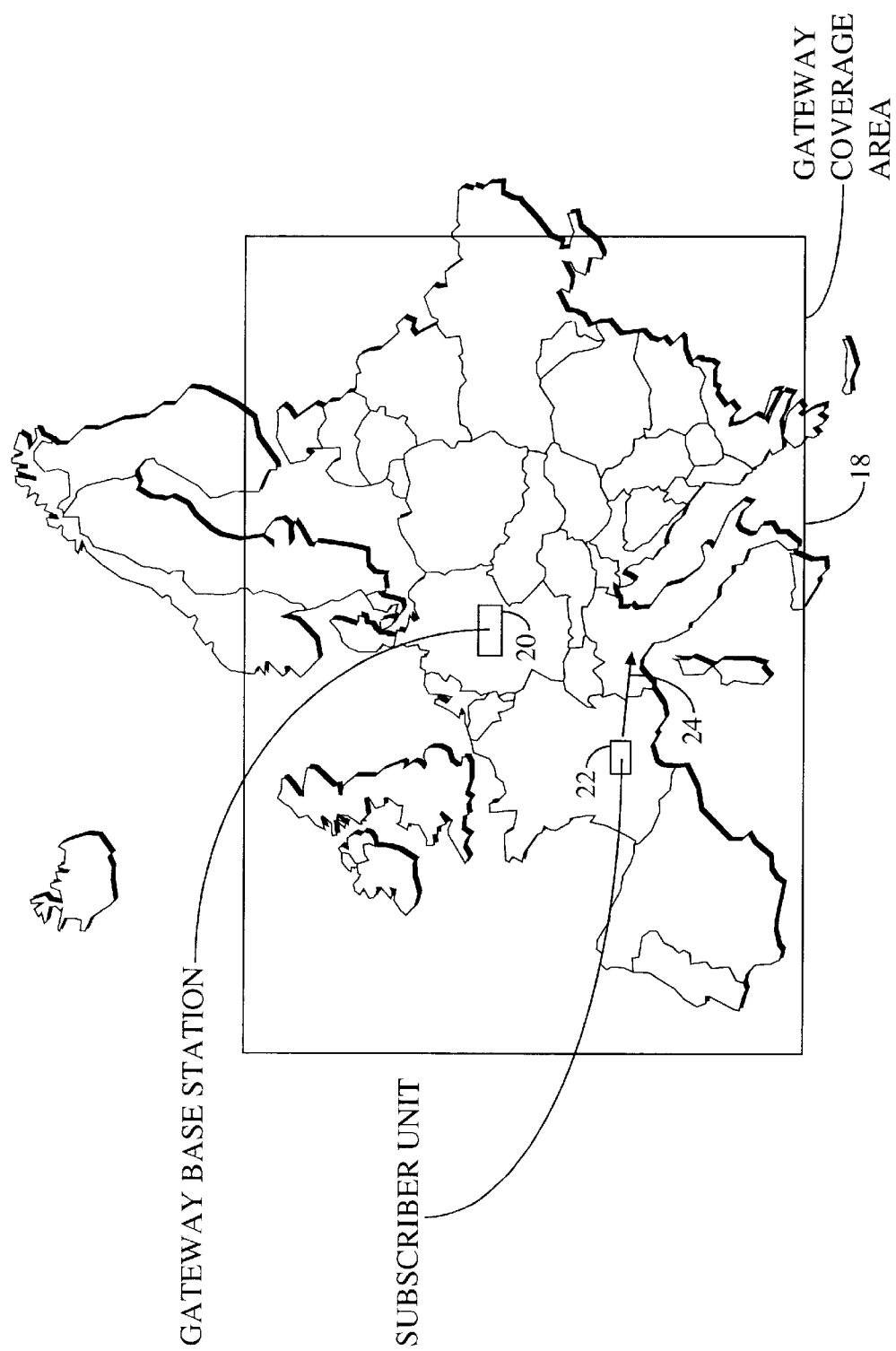
FIG. 2 is a diagram representing an exemplary coverage area for a single gateway ground station of the system of FIG. 1.

FIG. 4 illustrates pertinent components of a satellite-based system configured to perform the steps of FIGS. 3A and 3B. The system is similar to that of FIG. 1, with like components identified by like reference numerals incremented by 100, and only pertinent differences will be described in detail. A gateway ground station 210, subscriber unit 212 and satellite 214 are shown. Signals are transmitted between the subscriber unit and the gateway via the satellite. The gateway is also interconnected to a set of service providers, generally denoted 216, which provide an interconnection to local land line telephone networks or other communication networks.

Subscriber unit 212 includes a preferred service provider list 218 for use in selecting a preferred service provider. As noted above, an ID of the preferred service provider is transmitted to gateway 210 either as part of an access request over the access channel or in response to query from the gateway over received over the paging channel. Depending upon the implementations, the preferred service provider list may identify only a single service provider, a single service provider per gateway or perhaps a single service provider per country or area. The list may also identify service providers in order of preference. The list may also identify service providers that the user of the subscriber unit would prefer not to use including ones that, for one reason or another, the user will not or cannot access. Also depending upon the implementation, the service provider preference list is programmed by the subscriber unit manufacturer, point of sale personnel or the user. If the latter, the subscriber unit is provided with circuitry or software for receiving preferred service provider information from the user, perhaps input through a keypad of the subscriber unit or perhaps selected from a list presented to the user of a set of pre-stored permissible service providers. The database may alternatively be updated electronically via a dataport or updated based upon signals received via mobile communications from a gateway. In each case, all permissible service provider ID's are pre-stored such that the user need not know the ID's . Rather, the user need only know the name of the service provider. As can be appreciated, a wide variety of implementations are available in accordance with the principles of the invention.

Gateway 210 includes a service provider list 220 identifying all service providers connected to the gateway, a service provider location table 222 identifying the permissible coverage areas for each service provider of list 220, a subscriber unit location determination unit 224 and an available service provider determination unit 226. The subscriber unit location determination unit identifies the location of the mobile and applies that information to location table 222 to identify those service providers available for handling telephonic connections for subscriber units at that location. As noted above, the ability of a service provider to handle connections may be subject by contractual other legal constraints. Also as noted, the location of the subscriber unit is determined subject to some degree or accuracy or confidence factor. The confidence factor may be employed, in the manner discussed above, by the available service provider determination unit 226 in identifying the acceptable service providers.

After a list of acceptable service providers is generated, gateway 210 performs the steps described above to negotiate, if necessary, with subscriber unit 212 to allow selection of one of the service providers. Once a service provider has been selected, the gateway routes signals between the subscriber unit and the selected service provider for further processing of the telephone connection. Subsequent telephone connections initiated by the subscriber unit require re-identification of a service provider, which may or may not be a different service provider than the previous one selected.

FIG. 5 illustrates pertinent components of a system similar to that of FIG. 4, (with like components identifies by like reference numerals incremented by 100), but wherein the subscriber unit includes a GPS unit for determining location. Only pertinent differences will be described in detail.

A subscriber unit 312 is shown including a GPS unit 324 for determining the current location of the subscriber unit. GPS unit 324 determines the location of the subscriber unit in accordance with conventional GPS techniques and in connection with a fleet of GPS satellites (not separately shown). The location may be determined prior to initiation of a telephone connection or may be provided in response to a query from the gateway. In either case, once the location is determined, the subscriber unit transmits coordinates identifying the location to a gateway 310 to allow the gateway to determine which service providers are available for that location. The gateway then proceeds in the manner described above with reference to FIG. 3 to negotiate with the subscriber unit, if necessary, to select one of the service providers.

Thus far techniques of the invention have been described with reference to a telephone connection initiated by a subscriber unit. Similar techniques are performed for subscriber unit terminated connections. Also, similar techniques are performed to register a subscriber unit upon power up and to update registration periodically. Further, similar techniques may be performed for other mobile communications besides telephone calls.

What has been described is a system for selecting service providers for a mobile telephone system wherein selection is based upon location and user preferences. As noted, other selection criterion may also be employed consistent with the principles of the invention. For example, selection may be based, in whole or in part, upon the transmission frequency used, the time of day or date, or other factors. The subscriber unit may store information specifying rate schedules for different service providers and select preferred service providers based upon the current lowest rate. Also, selection may be based upon exclusive factors, rather than on inclusive factors. In this regard, the selection process may select all service providers not otherwise specifically excluded, perhaps as a result of billing issues with respect to specific mobile users. As far as location-based or position-based selection is concerned, the position need not merely be limited to lat./long. positions on the ground. Selection may be further based upon altitude, velocity or speed. For example, different discrimination factors may be employed to select preferred service providers for subscriber units in airplanes, boats or trains than for hand-held subscriber units carried on foot or in a car. As to velocity, because velocity includes a directional vector, a service provider can be selected that will be able to provide the longest service given the subscriber unit's speed and direction. For example, if the subscriber unit is in an aircraft initially over a geographical area wherein two service providers are available, but moving in a direction where only one of the two will soon be available, the system will select that service provider as the better service provider for that particular mobile communication. In general, principles of the invention may be applied to perform service provider selection based upon any suitable factor. Further, principles may apply to selection of other operating characteristics besides service providers, as well. Also, the principles of the invention are not limited to satellite-based mobile communications systems but are applicable to other communications systems as well.

The exemplary embodiments have been primarily described with reference to block diagrams illustrating apparatus elements and flow charts primarily illustrating method steps. As to the flowcharts, each block therein represents both a method step and an apparatus element for performing the recited step. Depending upon the implementation, each apparatus element, or portions thereof, may be configured in hardware, software, firmware or combinations thereof. It should be appreciated that not all components necessary for a complete implementation of a practical system are illustrated or described in detail. Rather, only those components necessary for a thorough understanding of the invention have been illustrated and described.

Finally, the preceding description of the preferred and exemplary embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A system for selecting a desired service provider for use in connection with a subscriber unit in a mobile communication system having two or more service providers, said system comprising:
    said subscriber unit, comprising:
        a database comprising a list of preferred service providers, wherein said list of preferred service providers is transmitted to a fixed transceiver upon the occurrence of a predetermined event; and
    said fixed transceiver, comprising:
        a transceiver for receiving said list of preferred service providers;
        a subscriber location determination unit for determining a location of said subscriber unit; and
        an available service provider determination unit for determining a list of available service providers based on said location;
    wherein said desired service provider is selected based on said list of preferred service providers and said list of available service providers.

2. The system of claim 1 wherein a degree of confidence is assigned to said location, said degree of confidence based upon the manner of location determination, said degree of confidence further used to determine said desired service provider.

3. The system of claim 1 wherein said desired service provider is selected by comparing said list of preferred service providers to said list of available service providers and selecting said desired service provider as any service provider that appears on both said list of preferred service providers and said list of available service providers.

4. The apparatus of claim 3, wherein a negotiation is initiated by said fixed transceiver with said subscriber unit to determine said desired service provider if more than one service provider appears on both said list of preferred service providers and said list of available service providers.

5. A system for selecting a service provider for use in connection with a subscriber unit in a mobile communication system having two or more service providers, said system comprising:
    said subscriber unit comprising:
        a position determination device for determining a location of said subscriber unit; and
        a database comprising a list of preferred service providers, wherein said desired service provider is selected from a list of available service providers transmitted by a fixed transceiver and said list of preferred service providers stored in said database, said desired service provider and said location transmitted to said fixed transceiver upon the occurrence of a predetermined event; and
    said fixed transceiver comprising:
        an available service provider determination unit for selecting said list of available service providers based on said location, wherein said list of available service providers is transmitted to said subscriber unit;
    wherein service is provided to said subscriber unit using said desired service provider.

6. The system of claim 5 wherein said database further comprises a constraint used to select said desired service provider, wherein said desired service provider is chosen using said list of available service providers, said list of preferred service providers stored in said database, and said constraint.

7. The system of claim 6 further comprising:
    a velocity determination device for determining a velocity of said subscriber unit;
    wherein said constraint comprises said velocity and said desired service provider is determined based on said list of available service providers transmitted by said fixed transceiver, said list of preferred service providers stored in said database, and said velocity.

8. The system of claim 6 further comprising:
    an altimeter for determining an altitude of said subscriber unit;
    wherein said constraint comprises said altitude and said desired service provider is determined based on said list of available service providers transmitted by said fixed transceiver, said list of preferred service providers stored in said database, and said altitude.

9. The system of claim 6 wherein said database further comprises:
    rate information corresponding to at least one service provider in said list of preferred service providers;
    wherein said constraint comprises said rate information and said desired service provider is determined based on said list of available service providers transmitted by said fixed transceiver, said list of preferred service providers stored in said database, and said rate information.

10. The system of claim 9 further comprising:
a timer for determining the time of day used for determining when each service provider listed in said list of preferred service providers offer a preferred rate;
wherein said constraint further comprises said time of day and said desired service provider is determined based on said list of available service providers transmitted by said fixed transceiver, said list of preferred service providers stored in said database, and said time of day.

11. The system of claim 5 further comprising an interface for allowing a subscriber unit user to alter said database.

12. The system of claim 11 wherein said interface allows said user to enter a new preferred service provider into said database.

13. The system of claim 11 wherein said interface allows said user to select a service provider to communicate through from said list of permissible service providers stored in said database.

14. The system of claim 11 wherein said interface comprises a dataport.

15. The system of claim 11 wherein said interface comprises a keypad and display.

16. A method for selecting a desired service provider for use in connection with a subscriber unit in a mobile communication system having two or more service providers, said method comprising the steps of:
storing a list of preferred service providers in said subscriber unit;
transmitting said list of preferred service providers to a fixed transceiver upon the occurrence of a predetermined event;
receiving said list of preferred service providers by said fixed transceiver;
determining a position of said subscriber unit;
determining a list of available service providers based on said location;
selecting said desired service provider based on said list of preferred service providers and said list of available service providers.

17. The method of claim 16 wherein the step of selecting said desired service provider comprises the steps of:
comparing said list of preferred service providers to said list of available service providers; and
selecting said desired service provider if any service provider appears on both said list of preferred service providers and said list of available service providers.

18. The method of claim 17 further comprising the steps of:
performing a negotiation between said fixed transceiver and said subscriber unit to determine said desired service provider if more than one service provider appears on both said list of preferred service providers and said list of available service providers.

19. The method of claim 17 further comprising the steps of:
assigning a degree of confidence to said location, said degree of confidence based upon the manner of location determination; and
using said degree of confidence to in conjunction with said list of preferred service providers and said list of available service providers to determine said desired service provider.

20. A method for selecting a desired service provider for use in connection with a subscriber unit in a mobile communication system having two or more service providers, comprising the steps of:
determining a location of said subscriber unit;
determining a list of available service providers able to service said subscriber unit based on said location;
transmitting said list of available service providers from a fixed transceiver to said subscriber unit;
selecting said desired service provider based on said list of available service providers and a list of preferred service providers stored within said subscriber unit;
transmitting said desired service provider to said fixed transceiver; and
providing communications service to said subscriber unit using said desired service provider.

21. The method of claim 20 wherein the step of selecting said desired service provider further comprises the steps of:
storing a constraint within said subscriber unit;
selecting said desired service provider using said list of available service providers provided by said fixed transceiver, said list of preferred service providers stored in said database, and said constraint.

22. The method of claim 21 further comprising the step of:
determining a velocity of said subscriber unit, wherein said constraint comprises said velocity.

23. The method of claim 21 further comprising the step of:
determining an altitude of said subscriber unit, wherein said constraint comprises said altitude.

24. The method of claim 21 further comprising the step of:
determining rate information corresponding to at least one service provider in said list of preferred service providers, wherein said constrain comprises said rate information.

25. The method of claim 24 further comprising the step of:
determining a time of day, wherein said constraint further comprises said time of day.

26. The method of claim 20 further comprising the step of:
altering said list of preferred service providers within said subscriber unit by a subscriber unit user using an interface.

27. The method of claim 26 wherein the step of altering said list of preferred service providers comprises the step of entering a new preferred service provider into said subscriber unit.

28. The method of claim 26 wherein the step of altering said list of preferred service providers comprises the step of selecting a service provider through which to communicate from said list of preferred service providers stored in said subscriber unit.

29. The method of claim 26 wherein said interface comprises a dataport.

30. The method of claim 26 wherein said interface comprises a keypad and display.

31. An apparatus for selecting a desired service provider for use in connection with a subscriber unit in a mobile communication system having two or more service providers, comprising:
said subscriber unit, comprising:
a database comprising a list of preferred service providers, wherein said list of preferred service providers is transmitted to a fixed transceiver upon the occurrence of a predetermined event, said list of preferred service providers used to select said desired service provider.

32. The apparatus of claim 31 wherein said subscriber unit further comprises:
a subscriber location determination unit for determining a location of said subscriber unit, said location transmitted to said fixed transceiver upon the occurrence of said predetermined event, wherein said desired service provider is determined using said list of preferred service providers and said location.

33. An apparatus for selecting a desired service provider for use in connection with a subscriber unit in a mobile communication system having two or more service providers, comprising:

a fixed transceiver, comprising:
a transceiver for receiving a list of preferred service providers from a subscriber unit;
a subscriber location determination unit for determining a location of said subscriber unit;
an available service provider determination unit for determining a list of available service providers based on said location;
wherein said desired service provider is selected based on said list of preferred service providers and said list of available service providers.

34. The apparatus of claim 33 wherein a degree of confidence is assigned to said location, said degree of confidence based upon the manner of location determination, said degree of confidence further used to determine said desired service provider.

35. The apparatus of claim 33 wherein said desired service provider is selected by comparing said list of preferred service providers to a list of available service providers and selecting said desired service provider as any service provider that appears on both said list of preferred service providers and said list of available service providers.

36. The apparatus of claim 35, wherein a negotiation is initiated by said fixed transceiver with said subscriber unit to determine said desired service provider if more than one service provider appears on both said list of preferred service providers and said list of available service providers.

37. An apparatus for selecting a desired service provider for use in connection with a subscriber unit in a mobile communication system having two or more service providers, comprising:

said subscriber unit, comprising:
a position determination device for determining a location of said subscriber unit; and
a database comprising a list of preferred service providers, wherein said desired service provider is selected from a list of available service providers transmitted by a fixed transceiver and said list of preferred service providers stored in said database, said desired service provider and said location transmitted to said fixed transceiver upon the occurrence of a predetermined event.

38. The apparatus of claim 37 wherein said database further comprises a constraint used to select said desired service provider, wherein said desired service provider is chosen using said list of available service providers provided by said fixed transceiver, said list of preferred service providers stored in said database, and said constraint.

39. The apparatus of claim 38 further comprising:
a velocity determination device for determining a velocity of said subscriber unit;
wherein said constraint comprises said velocity and said desired service provider is determined based on said list of available service providers transmitted by said fixed transceiver, said list of preferred service providers stored in said database, and said velocity.

40. The apparatus of claim 38 wherein said database further comprises:
rate information corresponding to at least one service provider in said list of preferred service providers;
wherein said constraint comprises said rate information and said desired service provider is determined based on said list of available service providers transmitted by said fixed transceiver, said list of preferred service providers stored in said database, and said rate information.

41. The apparatus of claim 38 further comprising:
a timer for determining the time of day used for determining when each service provider listed in said list of preferred service providers offer a preferred rate;
wherein said constraint further comprises said time of day and said desired service provider is determined based on said list of available service providers transmitted by said fixed transceiver, said list of preferred service providers stored in said database, and said time of day.

42. The apparatus of claim 38 further comprising:
an altimeter for determining an altitude of said subscriber;
wherein said constraint comprises said altitude and said desired service provider is determined based on said list of available service providers transmitted by said fixed transceiver, said list of preferred service providers stored in said database, and said altitude.

43. The apparatus of claim 37 further comprising an interface for allowing a subscriber unit user to alter said database.

44. The apparatus of claim 43 wherein said interface allows said user to enter a new service provider into said database.

45. The apparatus of claim 43 wherein said interface allows said user to select a service provider from said list of preferred service providers stored in said database.

46. The apparatus of claim 43 wherein said interface comprises a dataport.

47. The apparatus of claim 43 wherein said interface comprises a keypad and display.

48. A method for selecting a desired service provider for use in connection with a subscriber unit in a mobile communication system having two or more service providers, comprising the steps of:

storing a list of preferred service providers within said subscriber unit;
determining a position of said subscriber unit;
transmitting said position to a fixed transceiver;
receiving a list of available service providers from said fixed transceiver; and
determining said desired service provider based on said list of available service providers and said list of preferred service providers.

49. The method of claim 48 further comprising the step of:
storing a constraint within said subscriber unit; and
selecting said desired service provider using said list of available service providers, said list of preferred service providers, and said constraint.

50. The method of claim 49 further comprising the steps of:
determining a velocity of said subscriber unit;
wherein said constraint comprises said velocity and said desired service provider is determined based on said list of available service providers, said list of preferred service providers, and said velocity.

51. The method of claim 49 further comprising the steps of:
- storing rate information corresponding to at least one service provider in said list of preferred service providers;
- wherein said constraint comprises said rate information and said desired service provider is determined based on said list of available service providers, said list of preferred service providers, and said rate information.

52. The method of claim 49 further comprising the steps of:
- determining a time of day used for determining when each service provider listed in said list of preferred service providers offer a preferred rate;
- wherein said constraint further comprises said time of day and said desired service provider is determined based on said list of available service providers, said list of preferred service providers, and said time of day.

53. The method of claim 49 further comprising the steps of:
- determining an altitude of said subscriber unit;
- wherein said constraint comprises said altitude and said desired service provider is determined based on said list of available service providers transmitted by said fixed transceiver, said list of preferred service providers stored in said database, and said altitude.

54. The method of claim 48 wherein the step of determining said desired service provider comprises comparing said list of preferred service providers to said list of available service providers and selecting said desired service provider as any service provider that appears on both said list of preferred service providers and said list of available service providers.

55. The method of claim 54 further comprising the step of altering said list of preferred service providers by a subscriber unit user.

56. The method of claim 55 comprising the step of adding a new service provider to said list of preferred service providers by a subscriber unit user.

57. The method of claim 55 comprising the step of selecting a service provider through which to communicate from said list of preferred service providers by a subscriber unit user.

* * * * *